Patented Nov. 5, 1940

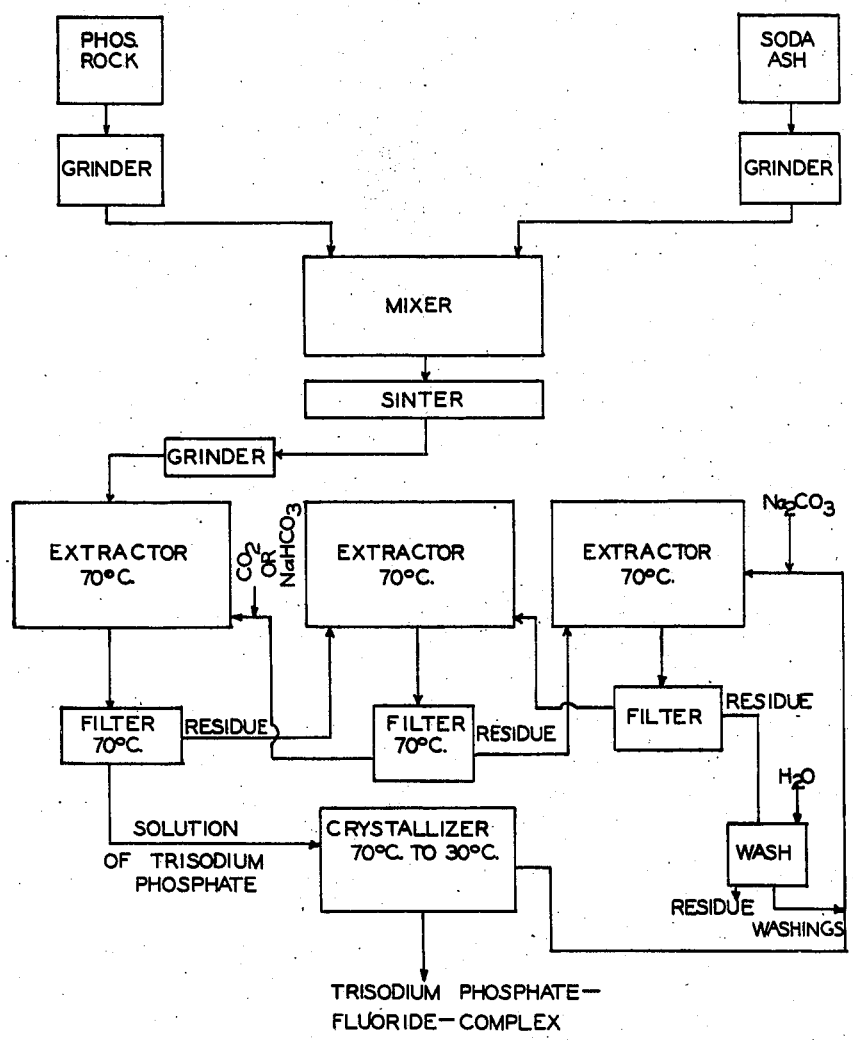

2,220,790

UNITED STATES PATENT OFFICE 2,220,790

PROCESS FOR THE PRODUCTION OF ALKALI METAL PHOSPHATES

Campbell R. McCullough, Anniston, Ala., assignor to Monsanto Chemical Company, a corporation of Delaware Application February 23, 1939, Serial No. 257,965

6 Claims. (Cl. 23—106)

This invention relates to a process for the production of alkali metal phosphates from phosphate rock.

One object of the present invention is the provision of a process for the production of alkali metal phosphates, that is, sodium or potassium phosphates directly from phosphate rock. A further object is the provision of a process whereby alkali metal phosphates may be obtained directly in the form of aqueous solutions of a concentration which may be crystallized directly to yield the alkali metal phosphates in crystalline form.

The accompanying drawing illustrates a flow sheet which may be referred to for a fuller understanding of the process herein described, as applied to the production of trisodium phosphate.

Briefly described, my process uses as a raw material ordinary raw phosphate rock. I heat or sinter this material with an alkaline substance capable of being converted by heat into an alkali metal oxide, such as an alkaline carbonate or hydroxide, in order to break down the molecular structure of the phosphate rock and thereby produce a material from which phosphates may be readily dissolved. The solution of the sintered phosphate is effected by a leaching operation in which the finely divided sintered phosphate is extracted with an alkaline carbonate solution. The leaching operation yields a concentrated solution of alkali phosphate from which the contained alkali phosphate can be crystallized directly in the form of a tri-alkali metal phosphate, usually associated with fluoride which is ordinarily present in the phosphate ores.

My process will be described in such detail as to enable one skilled in the art to which it appertains to carry out the process. The following detailed description contemplates the production of trisodium phosphate; however, it will be apparent as later herein pointed out, that it can also be used for the production of potassium phosphates and also the di-alkali metal phosphates.

A finely divided phosphate ore, natural apatite, probably consisting mainly of $(Ca_3(PO_4)_2)_3CaF_2$ and analyzing as follows:

| | Per cent |
|---|---|
| $P_2O_5$ | 33.35 |
| $CaO$ | 44.78 |
| $Fe_2O_3$ | 2.31 |
| $Al_2O_3$ | 1.73 |
| $F$ | 3.27 |
| $SiO_2$ | 6.87 |
| $CO_2$ | 1.69 | is finely ground and mixed with ground sodium carbonate in the proportions of 2 mols of $Na_2O$ per mol of $P_2O_5$ and heated to about 1,000° C. After sintering the material analyzed:

| | Per cent |
|---|---|
| $P_2O_5$ | 24.87 |
| $CaO$ | 34.06 |
| $Fe_2O_3$ | 2.03 |
| $Al_2O_3$ | 2.09 |
| $F$ | 2.46 |
| $SiO_2$ | 7.25 |
| $CO_2$ | 3.14 |
| $Na_2O$ | 21.7 |

The sintered phosphate is extracted with a sodium carbonate solution in order to dissolve the phosphate. In practice I take, say 60 grams (containing 15 grams of $P_2O_5$) of the above sintered product, having first finely ground the same, and extract it with 1000 c. c. of liquor containing 300 grams of $Na_2CO_3$ and 30 grams of NaOH. The extracting liquor is the leachate from the second extraction, obtained as described below, and hence also contains some dissolved $P_2O_5$. The extraction is best effected while accompanied by a grinding operation and hence may be carried out in a ball mill. The temperature during extraction is preferably maintained at 70° C. and for a period of, say, 45 minutes. The liquor after extraction is filtered at 70° C. and contains 0.027 gram of $P_2O_5$ per cubic centimeter. Before extraction the liquor contained 0.020 gram of $P_2O_5$ per c. c. Approximately 5.5 gm. or 36.7% of the $P_2O_5$ contained in the sintered product is extracted in this step. After extraction the liquor is subjected to fractional crystallization by cooling to obtain trisodium phosphate crystals, as described below.

The residue from the first extraction is again subjected to a second extraction with 1000 c. c. of a solution containing 300 grams of $Na_2CO_3$, 30 grams of NaOH and 0.0123 gram of $P_2O_5$ per cubic centimeter in solution. The extraction is carried out at the same temperature, i. e., 70° C. and also for 45 minutes, the extraction also being carried out in a ball mill as above. After filtration at 70° C. the solution contains 0.019 gram of $P_2O_5$ per cubic centimeter. The solution before extraction contained 12.3 grams of $P_2O_5$ and the solution leached 6.15 grams of $P_2O_5$ from the residue, or 41.0% of the original $P_2O_5$ present. The filtered solutions thus obtained may be used as the first extracting solution for a new lot of sintered product.

The solid residue from the second extraction is now subjected to a third extraction using 1000 c. c. of a solution containing 300 grams of $Na_2CO_3$ and 20 grams of NaOH. Extraction is carried out at 70° C. in a ball mill for 45 minutes, and the solution filtered at 70° C. The filtered solution contains 0.011 gram of $P_2O_5$ per cubic centimeter and thereafter may be used as the extracting solution for the second extraction. This extraction removed 1.9 grams of $P_2O_5$ or 12.7% of the original $P_2O_5$ in the sinter.

The residue from the third extraction contains 10% of the $P_2O_5$ originally present in the ore and may be washed with water to obtain an additional 5% of the $P_2O_5$ contained in the sinter. After washing, the residue, which is largely calcium carbonate, is discarded.

The leachate from the first extraction has a volume of 945 c. c. and contains the following:

| | Gram/c. c. |
|---|---|
| $P_2O_5$ | 0.027 |
| $Na_2CO_3$ | 0.300 |
| NaOH | 0.03 |
| F | 0.0023 |

The specific gravity is 1.33 at 70° C. The solution is crystallized by cooling to 30° C. The yield of crystals is 95.5 grams. The analysis of the crystals is as follows:

| | Per cent |
|---|---|
| $P_2O_5$ | 18.22 |
| $CO_2$ | 1.86 |
| F | 2.04 |
| $H_2O$ | 48.4 | and the composition of the crystals:

| | Per cent |
|---|---|
| $Na_3PO_4$ | 42.2 |
| $Na_2CO_3$ | 4.48 |
| NaF | 4.5 |
| NaOH | 0.4 |
| $H_2O$ of crystallization | 48.4 |

The 893 c. c. of mother liquor has a specific gravity of 1.32 at 30° C. and a composition as follows:

| | Gram/c. c. |
|---|---|
| $P_2O_5$ | 0.0092 |
| $Na_2CO_3$ | 0.30 |
| NaOH | 0.04 |
| F | 0.00015 |

The mother liquor is now used as the extracting solution for the third extraction mentioned above.

The process described above constitutes one way by which the present invention may be practiced. Some modifications may be effected without departing from the spirit of the invention. In practice I may, in place of using three successive and separate extractions, use one continuous counter-current extraction process without employing the intermediate filtrations mentioned above.

For the successful working of the process the following limitations are of importance:

1. *Proportions of phosphate rock and soda ash used in sintering*

In the above example I have indicated a preferred proportion of 2 mols of $Na_2O$ to 1 mol of $P_2O_5$ present in the rock. This proportion may be varied from 1.0 mol of $Na_2O$ to 6.0 mols of $Na_2O$ to 1 mol of $P_2O_5$. This upper limit is fixed by the $Na_2CO_3$ requirement of the process. This limit is also suitable when using NaOH, however, the excess NaOH appearing in the extraction solution must be carbonated as hereinafter described. The temperatures used in sintering may vary from the melting point of the alkali metal carbonate or hydroxide upwardly to temperatures of 1,300° C.

2. *Temperature of extracting solutions*

The temperature of the saturated sodium carbonate solution used for the extractions of trisodium phosphate should be below 80° C., as at temperatures above this limit reversion occurs. Since the solutions used for extraction are nearly saturated with sodium carbonate at temperatures of 65° to 70° C., it is of course undesirable to work at temperatures below that at which the carbonate will crystallize out. At lower temperatures of extraction a more dilute solution of sodium carbonate may be used. For example at 40° C. a solution of $Na_2CO_3$ one-half saturated, may be used.

3. *Composition of extracting solution*

The concentration of the carbonate solution is preferably that near saturation, as with such solutions the tendency for reversion (formation of insoluble phosphates) is a minimum. The carbonate concentration required to prevent reversion is also dependent upon the presence of free alkali, that is, NaOH, present in the extracting solution. In the presence of free caustic, higher carbonate concentrations should be employed for extraction.

It is ordinarily desirable to maintain the caustic soda, NaOH, present in the extracting solution at about 1 to 2% by weight. The presence of NaOH at this concentration is desirable in order to obtain a tri-alkali phosphate upon crystallization. Since there is a tendency to constantly increase the caustic in the extracting solution due to the loss of $CO_2$ from the ash during sintering, it is desirable to control the caustic concentration by the addition of $CO_2$ or sodium bicarbonate to the solution to maintain the NaOH concentration within the desired limits.

By neutralizing the free NaOH present in the extracting solution either with $CO_2$ or with $NaHCO_3$, I may operate my process to produce disodium orthophosphate in place of trisodium orthophosphate. Such neutralization is desirably carried to the point where all of the $Na_2O$ present in the extracting solution above that combined as disodium orthophosphate is converted and maintained during extraction as the normal carbonate, $Na_2CO_3$. The extraction of the sintered phosphate then proceeds as above described.

When operating in a manner to produce the disodium orthophosphate I am able, during extraction to employ somewhat higher temperatures. I may accordingly when producing disodium orthophosphate by this modification of my process employ extracting temperatures up to 100° C. Under these conditions I may also use carbonate solutions, saturated in the region of 40° C. to 100° C. These wide temperature limits are possible because of the flat solubility curve of anhydrous sodium carbonate.

Furthermore by controlling the alkalinity within the limits stated it is possible to prepare solutions from which mixtures of disodium and trisodium phosphates may be crystallized.

4. *Phosphate concentration*

Using a concentrated soda ash ($Na_2CO_3$) solution at an extracting temperature of 75° C., it is possible to obtain a part of the soluble $P_2O_5$ at a concentration of 0.04 gram/c. c. in the presence of 1 to 2% NaOH. In practice I prefer to obtain solutions having a concentration of about 0.025 gram/c. c. of $P_2O_5$ with such a solution. The lower $P_2O_5$ concentrations are desirable, consistent with the formation of a suitable crystallizing solution, as they exhibit less of a tendency to cause reversion of the phosphate to the insoluble form.

5. Other constituents in the extracting solution

The most important of these is fluorine. When fluorine is present in the solution there is a tendency to form fluoro-apatite, which is more insoluble than the tricalcium phosphate and also than calcium carbonate. Fortunately the process here described provides for a removal of the fluorine together with the soluble phosphate by crystallization and thus prevents the accumulation of objectionable amounts of fluorine in the solutions.

The extraction process itself is not a simple uniform chemical reaction. Thus the initial $P_2O_5$ extracted from a natural rock cracked with soda ash is low in fluorine. As the extraction proceeds the fluorine extracts more readily, so that ultimately when all of the $P_2O_5$ has been extracted, the fluorine has also been completely extracted. Since the first $P_2O_5$ is extracted more readily than the last, and the fluorine is temporarily withheld at the beginning of the extraction, a countercurrent extraction system is advantageous.

The alkaline phosphate product obtained by the crystallization of the filtered extraction solution containing free caustic soda is a trisodium phosphate-sodium fluoride complex. For many purposes, such as water softening and washing, the fluoride complex can be used as well as a more alkaline phosphate. For purposes where a fluoride-free product is desired the crystalline product here obtained may be treated for the separation of the sodium fluoride by a process such as is disclosed in copending application, Ser. No. 257,968, filed February 23, 1939.

I may also treat by my process those phosphate ores containing fluorine in reduced amount, such as are obtained by thermal treatment of phosphatic ores in the presence of steam.

When producing the dialkali metal phosphates by the suggested modification of my process it is desirable either to operate the process using a phosphate containing fluorine in reduced amount, since the crystallization of the dialkali metal phosphate does not remove fluorine from solution as does the crystallization of the trialkali metal phosphates. Should fluorine increase to objectionable values in the crystallizing solution it can be removed, from time to time by the crystallization therefrom of the trialkali metal phosphate-fluoride complex.

What I claim is:

1. The process for the production of trialkali metal phosphate comprising sintering together a mixture of a natural apatite ore and an alkali metal carbonate in the proportions of from 1 mol to 6 mols of alkali metal to each mol of $P_2O_5$ in said apatite at a temperature above the melting point of said carbonate, then extracting at a temperature of 80° C. said sintered product with an alkali carbonate solution saturated at 65 to 70° C., said solution containing a small amount of caustic alkali.

2. The process for the production of trisodium phosphate, comprising sintering together a mixture of a natural apatite ore and normal sodium carbonate in the proportions of from 1 mol to 6 mols of alkali metal to each mol of $P_2O_5$ in said ore at a temperature above the melting point of said carbonate, then extracting said sintered product at a temperature of from 40° C. to 80° C. by means of a saturated solution of sodium carbonate containing a small amount of free NaOH.

3. The process for the production of trisodium phosphate, comprising sintering together a mixture of a natural apatite ore and normal sodium carbonate in the proportions of 2 mols of $Na_2O$ to 1 mol of $P_2O_5$ and then extracting said sintered product at a temperature in excess of 40° C. and below 80° C. by means of a saturated sodium carbonate solution containing from 1% to 2% of NaOH to produce an extracted solution containing between 0.025 gram of $P_2O_5$ per c. c. and 0.04 gram of $P_2O_5$ per c. c. and thereupon crystallizing out trisodium phosphate from said extracting solution.

4. The process for the production of trisodium phosphate, comprising sintering together a mixture of a natural apatite ore and soda ash in the proportions of 2 mols of $Na_2O$ to 1 mol of $P_2O_5$ at a temperature above the melting point of soda ash, extracting said sintered product at 80° C. with a soda ash solution saturated at 65° C. to 70° C. containing from 1% to 2% of free NaOH to obtain in said solution a concentration of phosphate of between 0.025 gm. and 0.04 gram per c. c. and crystallizing trisodium phosphate from said solution.

5. The process for the production of trisodium phosphate comprising sintering a mixture of a natural apatite ore and soda ash, said sintering being effective to break down the molecular structure of said ore, thereupon leaching said sintered product with a substantially saturated soda ash solution containing 1% to 2% of NaOH while milling the same at a temperature of about 80° C. to produce a solution containing from 0.025 gram to 0.04 gram of $P_2O_5$ per c. c., and crystallizing said solution to obtain crystalline trisodium phosphate.

6. The process for the production of trisodium phosphate comprising sintering a mixture of a finely ground natural apatite ore and soda ash under conditions to break down the natural apatite structure of said ore, leaching said sintered ore at a temperature of about 80° C. with a saturated soda ash solution containing 1% to 2% of free NaOH while milling the same, to produce a solution containing from 0.025 gram to 0.04 gram of $P_2O_5$ per c. c. of said solution, and cooling said solution to below the extraction temperature to crystallize out a trisodium phosphate sodium fluoride complex salt.

CAMPBELL R. McCULLOUGH.